United States Patent
Gotanda

(10) Patent No.: US 7,321,395 B2
(45) Date of Patent: Jan. 22, 2008

(54) IMAGE CAPTURING APPARATUS AND METHOD OF SETTING EXPOSURE FOR AF CONTROL EXECUTED BY IMAGE CAPTURING APPARATUS

(75) Inventor: Yoshiharu Gotanda, Asaka (JP)

(73) Assignee: FUJIFILM Corporation, Tokyo (JP)

(*) Notice: Subject to any disclaimer, the term of this patent is extended or adjusted under 35 U.S.C. 154(b) by 759 days.

(21) Appl. No.: 10/702,774

(22) Filed: Nov. 7, 2003

(65) Prior Publication Data

US 2004/0095505 A1 May 20, 2004

(30) Foreign Application Priority Data

Nov. 8, 2002 (JP) .............................. 2002-324560

(51) Int. Cl.
*H04N 5/232* (2006.01)
(52) U.S. Cl. ...................... 348/370; 348/371; 348/345; 348/362
(58) Field of Classification Search ................ 348/362, 348/363, 370, 371
See application file for complete search history.

(56) References Cited

U.S. PATENT DOCUMENTS

| | | | |
|---|---|---|---|
| 5,831,676 A * | 11/1998 | Takahashi et al. ........... | 348/362 |
| 6,075,562 A * | 6/2000 | Sakaguchi et al. ........ | 348/223.1 |
| 6,359,651 B1 * | 3/2002 | Yokonuma .................. | 348/370 |
| 6,426,775 B1 * | 7/2002 | Kurokawa ................... | 348/363 |
| 6,700,614 B1 * | 3/2004 | Hata ........................... | 348/345 |
| 6,700,619 B1 * | 3/2004 | Hamamura ................. | 348/370 |
| 6,839,087 B1 * | 1/2005 | Sato ............................ | 348/362 |
| 7,071,987 B1 * | 7/2006 | Tanaka ........................ | 348/362 |
| 7,145,602 B2 * | 12/2006 | Shiga ......................... | 348/362 |
| 7,154,547 B2 * | 12/2006 | Oda ............................ | 348/277 |
| 2002/0191102 A1 * | 12/2002 | Yuyama et al. ............ | 348/370 |
| 2003/0095192 A1 * | 5/2003 | Horiuchi .................. | 348/222.1 |

FOREIGN PATENT DOCUMENTS

| JP | 03-070272 A | 3/1991 |
|---|---|---|
| JP | 08-160489 A | 6/1996 |
| JP | 2000-121924 A | 4/2000 |

* cited by examiner

*Primary Examiner*—Lin Ye
*Assistant Examiner*—Pritham D. Prabhakher
(74) *Attorney, Agent, or Firm*—Birch, Stewart, Kolasch & Birch, LLP

(57) ABSTRACT

It the image capturing apparatus, if AF control is carried out by illuminating an object with AF auxiliary light, then when the auxiliary light is emitted, exposure for the AF control is set according to an EV value determined by illuminating the object with the auxiliary light. Thus, even if the AF auxiliary light needs to be emitted, the AF control can be accurately carried out with the appropriate exposure setting.

10 Claims, 7 Drawing Sheets

IMAGE CAPTURING APPARATUS AND METHOD OF SETTING EXPOSURE FOR AF CONTROL EXECUTED BY IMAGE CAPTURING APPARATUS

This Nonprovisional application claims priority under 35 U.S.C. § 119(a) on Patent Application No(s). 2002-324560 filed in JAPAN on Nov. 8, 2002, the entire contents of which are hereby incorporated by reference.

BACKGROUND OF THE INVENTION

1. Field of the Invention

The present invention relates to an image capturing apparatus and a method of setting exposure for Auto Focus (AF) control executed by an image capturing apparatus, and in particular, to an image capturing apparatus that illuminates an object with AF auxiliary light when the object is determined to be dark before an AF operation as well as a method of setting exposure for AF control executed by an image capturing apparatus.

2. Description of the Related Art

Image capturing apparatus such as a digital camera and a mobile telephone or personal digital assistant having image capturing function, uses an image pickup element to convert an optical image of an object into an electric signal for recording. In the digital camera, an image taking lens is generally subjected to AF control according to contrast information on an image obtained from the image pickup element (contrast AF). However, when it gets dark as in the case with nighttime, the contrast of the object lowers. In this case, the contrast AF cannot enable a focus state to be properly determined.

Japanese Patent Application Publication No. 8-160489 discloses a camera in which a camera body comprises a light emitting device that illuminates the object with AF auxiliary light when its gets dark. However, this camera simply emits auxiliary light, and overexposure or underexposure may disadvantageously occur during an AF operation depending on the distance to the object. This hinders the focus from being accurately determined.

SUMMARY OF THE INVENTION

The present invention is provided in view of these circumstances. It is an object of the present invention to provide an image capturing apparatus that can carry out AF control using an appropriate exposure setting as well as a method of setting exposure for AF control executed by an image capturing apparatus.

In order to attain the above-described object, the present invention is directed to an image capturing apparatus, comprising: an image pickup device; an image taking lens which forms an image of an object on the image pickup device, the image taking lens being subjected to autofocus control so as to focus on a main object according to contrast information on the image obtained from the image pickup device; an autofocus auxiliary light emitting device which emits autofocus auxiliary light to illuminate the object when a photometric value of the object is smaller than a predetermined value; and a setting device which operates when the autofocus auxiliary light is emitted, to set an aperture value and a shutter speed for the autofocus control according to a photometric value determined with illuminating the object with the autofocus auxiliary light.

According to the present invention, if the AF control is carried out by emitting the AF auxiliary light, the aperture value and the shutter speed for the AF control are set according to the photometric value determined by illuminating the object with the auxiliary light. Thus, contrast information can be acquired according to an image obtained using the appropriate exposure setting. Consequently, the focus state can be accurately determined.

Preferably, if the autofocus auxiliary light is not emitted, the setting device sets the aperture value and the shutter speed for the autofocus control according to a photometric value determined without illuminating the object with the autofocus auxiliary light. According to the present invention, if the AF auxiliary light is not emitted, the aperture value and the shutter speed for the AF control are set according to the photometric value determined without illuminating the object with the AF auxiliary light. Thus, even if the AF auxiliary light is not emitted, the focus state can be accurately determined.

Preferably, the setting device sets one of the aperture value and the shutter speed at a fixed value and sets the other according to the photometric value of the object. According to the present invention, if for example, the aperture value is fixed, the shutter speed for the AF control is set according to the photometric value for the object. On the other hand, if for example, the shutter speed is fixed, the aperture value for the AF control is set according to the photometric value for the object.

The present invention is also directed to an image capturing apparatus, comprising: an image pickup device; an image taking lens which forms an image of an object on the image pickup device, the image taking lens being subjected to autofocus control so as to focus on a main object according to contrast information on the image obtained from the image pickup device; an autofocus auxiliary light emitting device which emits autofocus auxiliary light to illuminate the object when a photometric value of the object is smaller than a predetermined value; and a setting device which operates when the autofocus auxiliary light is emitted, to set an amount of emitted autofocus auxiliary light according to a photometric value determined with illuminating the object with the autofocus auxiliary light.

According to the present invention, if the AF control is carried out by emitting the AF auxiliary light, the amount of emitted AF auxiliary light is set according to the photometric value determined by illuminating the object with the AF auxiliary light. Thus, contrast information can be acquired according to an image obtained using the appropriate exposure setting. Consequently, the focus state can be accurately determined.

Preferably, the image capturing apparatus further comprises a second setting device which operates when the autofocus auxiliary light is not emitted, to set an aperture value and a shutter speed for the autofocus control according to a photometric value determined without illuminating the object with the autofocus auxiliary light. According to the present invention, if the AF control is carried out without emitting the AF auxiliary light, the second setting device sets the aperture value and the shutter speed for the AF control according to the photometric value determined without illuminating the object with the AF auxiliary light. Thus, even if the AF auxiliary light is not emitted, the focus state can be accurately determined.

The present invention is also directed to a method of setting exposure for autofocus control executed by an image capturing apparatus having an image taking lens subjected to autofocus control so as to focus on a main object according to contrast information on an image obtained from an image pickup device, the object being illuminated with autofocus auxiliary light if a photometric value of the object is smaller than a predetermined value, the method comprising: determining the photometric value of the object to determine whether or not the autofocus auxiliary light needs to be emitted; if the autofocus auxiliary light needs to be emitted, illuminating the object with the autofocus auxiliary light and acquiring a photometric value; and setting an aperture value and a shutter speed for the autofocus control according to the photometric value acquired.

According to the present invention, before AF control, first, the photometric value of the object is determined to determine whether or not the AF auxiliary light needs to be emitted. Then, if the AF auxiliary light needs to be emitted, the object is illuminated with the AF auxiliary light to acquire a photometric value. Subsequently, the aperture value and the shutter speed for the AF control are set according to the photometric value acquired. Thus, contrast information can be acquired according to an image obtained using the appropriate exposure setting. Consequently, the focus state can be accurately determined.

The present invention is also directed to a method of setting exposure for autofocus control executed by an image capturing apparatus having an image taking lens subjected to autofocus control so as to focus on a main object according to contrast information on an image obtained from an image pickup device, the object being illuminated with autofocus auxiliary light if a photometric value of the object is smaller than a predetermined value, the method comprising: determining the photometric value of the object to determine whether or not the autofocus auxiliary light needs to be emitted; if the autofocus auxiliary light needs to be emitted, illuminating the object with the autofocus auxiliary light and acquiring a photometric value; and setting an amount of emitted autofocus auxiliary light for the autofocus control according to the photometric value acquired.

According to the present invention, before AF control, first, the photometric value of the object is determined to determine whether or not the AF auxiliary light needs to be emitted. Then, if the AF auxiliary light needs to be emitted, the object is illuminated with the AF auxiliary light to acquire a photometric value. Subsequently, the amount of emitted AF auxiliary light for the AF control is set according to the photometric value acquired. Thus, contrast information can be acquired according to an image obtained using the appropriate exposure setting. Consequently, the focus state can be accurately determined.

Preferably, if the autofocus auxiliary light does not need to be emitted, the aperture value and the shutter speed for the autofocus control are set according to the photometric value determined when determining whether or not the autofocus auxiliary light needs to be emitted. According to the present invention, if the AF control is carried out without emitting the AF auxiliary light, the aperture value and the shutter speed for the AF control are set according to the photometric value determined when determining whether or not the AF auxiliary light needs to be emitted. Thus, even if the AF auxiliary light is not emitted, the focus state can be accurately determined.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

With reference to the drawings, description will be given below of an image capturing apparatus and a method of setting exposure for AF control executed by an the image capturing apparatus.

Figure 1:
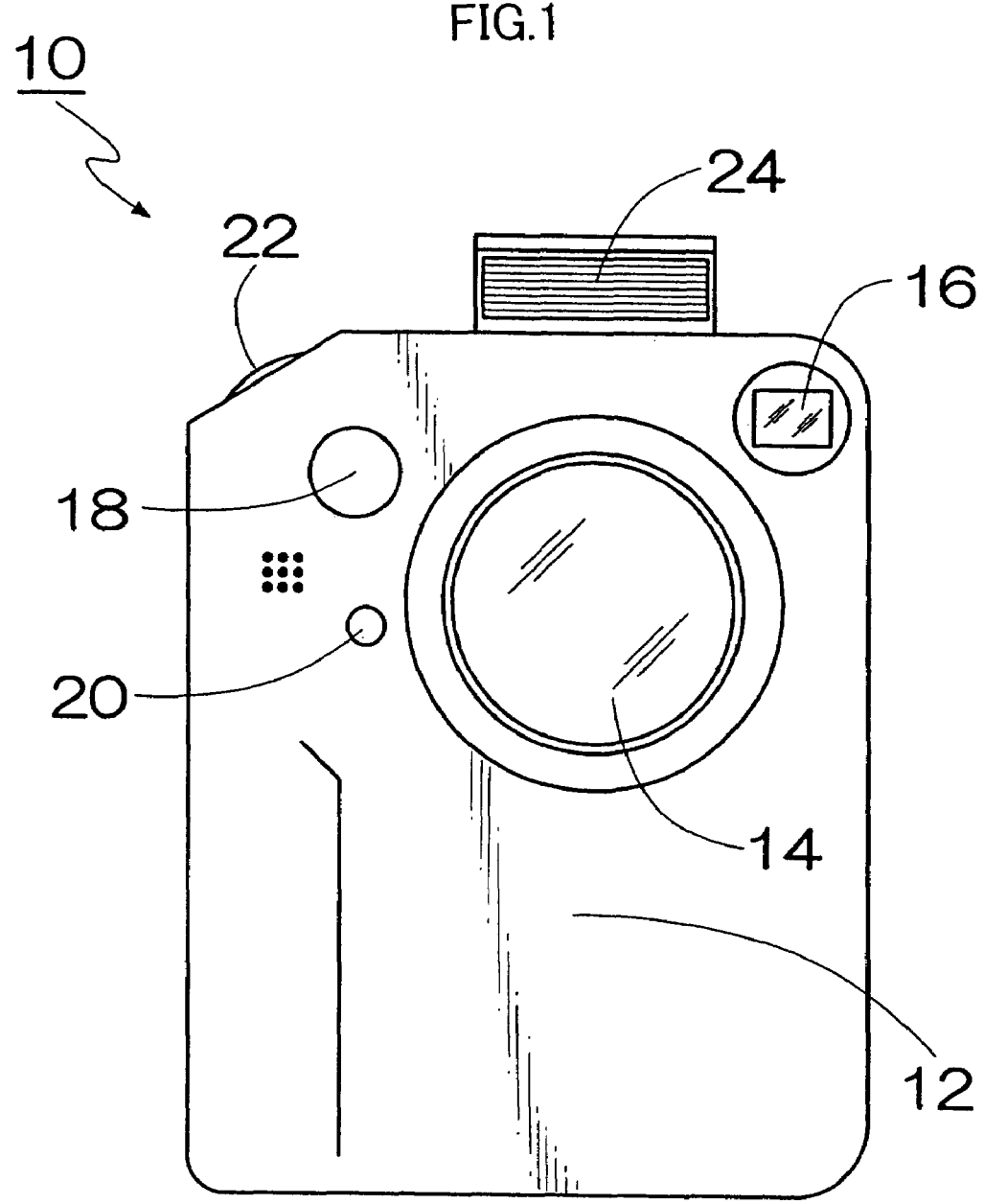
FIG. 1 is a front view showing a digital camera according to an embodiment of the present invention.
Figure 2:
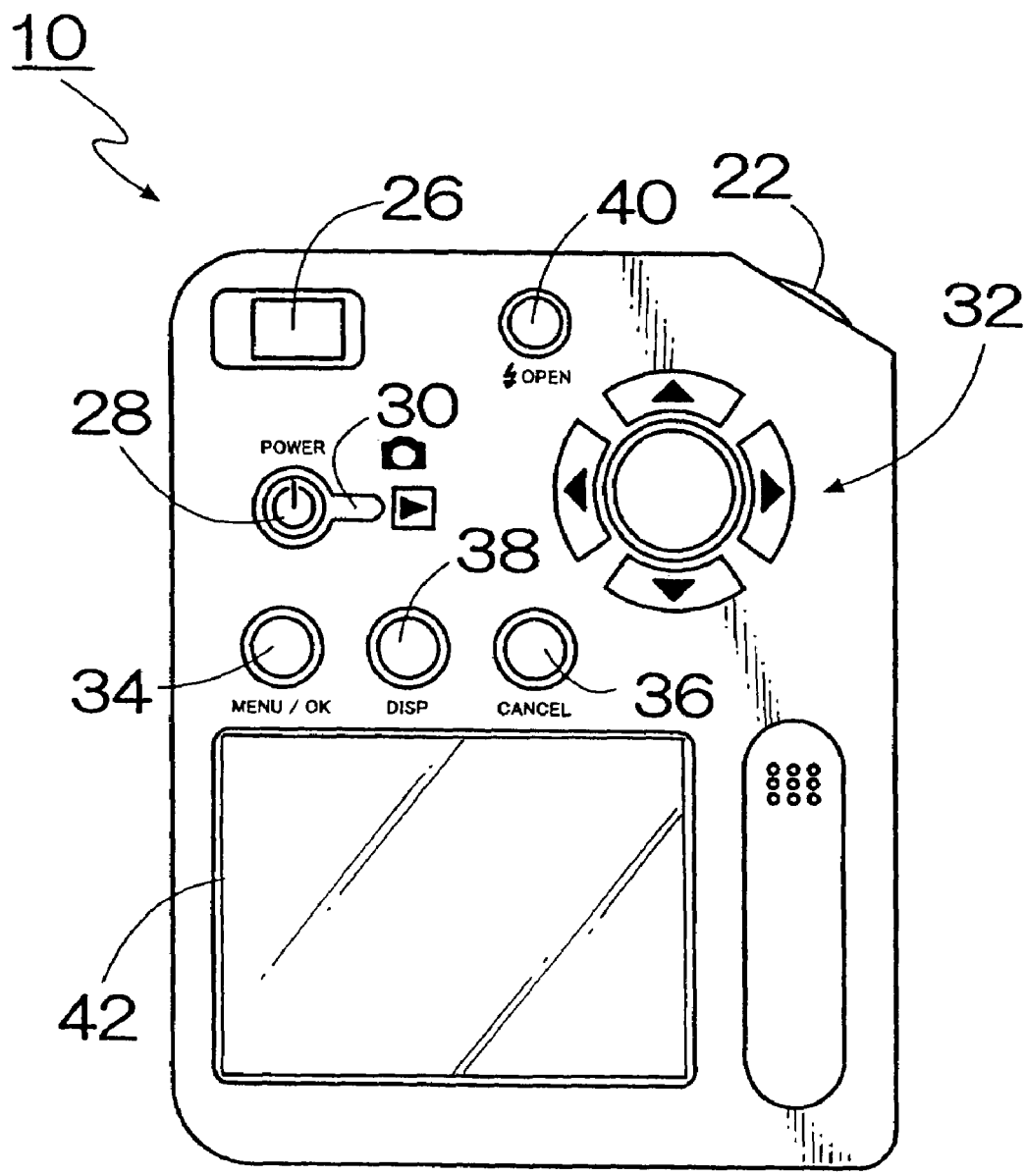
FIG. 2 is a rear view showing the digital camera.

FIGS. 1 and 2 are a front view and a rear view, respectively, showing a digital camera 10 according to an embodiment of the present invention. As shown in these drawings, the digital camera 10 has a camera body 12 shaped like a rectangular box. A front surface of the camera body 12 is provided with an image taking lens 14, a finder window 16, an AF auxiliary light lamp 18, an electric flash dimming sensor 20, and the like. The camera body 12 also has a release button 22 and an electric flash 24 on its top surface. A rear surface of the camera body 12 is provided with a finder 26, a power button 28, a mode lever 30, a cross button 32, a menu/OK button 34, a cancel button 36, a display button 38, an electric flash popup button 40, a liquid crystal monitor 42, and the like.

An image taking lens 14 is composed of a collapsible zoom lens. When the power supply to the digital camera 10 is turned on in an image taking mode, the image taking lens 14 is extended out of the camera body 12. When the power supply is turned off, the image taking lens 12 collapses into the camera body 12.

The release button 22 is composed of a two-level stroke type button that allows a user to press this button to two levels corresponding to what is called "half press" and "full press". A "half press" activates an Auto Focus (AF), Auto Exposure (AE), and Auto White Balance (AWB) operations. A "full press" causes an image to be captured.

The electric flash 24 is of a popup type and is projected out of the top surface of the camera body 12 when the electric flash popup button 40, provided on the rear surface of the camera body 12, is pressed. FIG. 1 shows that the electric flash 24 has been popped up. FIG. 2 shows that the electric flash 24 is housed in the camera body 12.

The mode lever 30 is turnably arranged around the power button 28. The position of the mode lever 30 sets the mode of the digital camera 10. Specifically, by positioning the mode lever 30 at a camera mark, the digital camera 10 is set in an "image taking mode" in which a still image is taken. By positioning the mode lever 30 at a play mark, the digital camera 10 is set in a "play mode" in which a taken image is reproduced.

The cross button 32 allows the user to input an instruction for a corresponding one of the four directions (up, down, right, and left). The user operates the cross button 32 to select a menu item from a menu screen or select from various setting items. Furthermore, in the image taking mode, the up and down buttons of the cross button 32 function as zoom buttons (the up button corresponds to a telescoping side, whereas the down button corresponds to a wide-angle side). The right and left buttons function as a macro button (macro function on/off button) and an electric flash mode setting button (setting button for an auto, forced emission, red-eye reduction, and slow synchronicity mode), respectively. On the other hand, in the play mode, the right and left buttons function as a frame feed button and a frame return button, respectively. The up and down buttons function an enlargement and reduction buttons, respectively.

The menu/OK button 34 is used to display a menu screen and enter and execute a selected content. The cancel button 36 is used to cancel an item selected from a menu or return to the preceding operation.

The liquid crystal monitor 42 is used to reproduce a taken image and is used as a menu display screen. Furthermore, in the image taking mode, the liquid crystal monitor 42 is used as an electronic view finder to check the angle of view. The display button 38 functions to switch on and off the electronic view finder.

Figure 3:
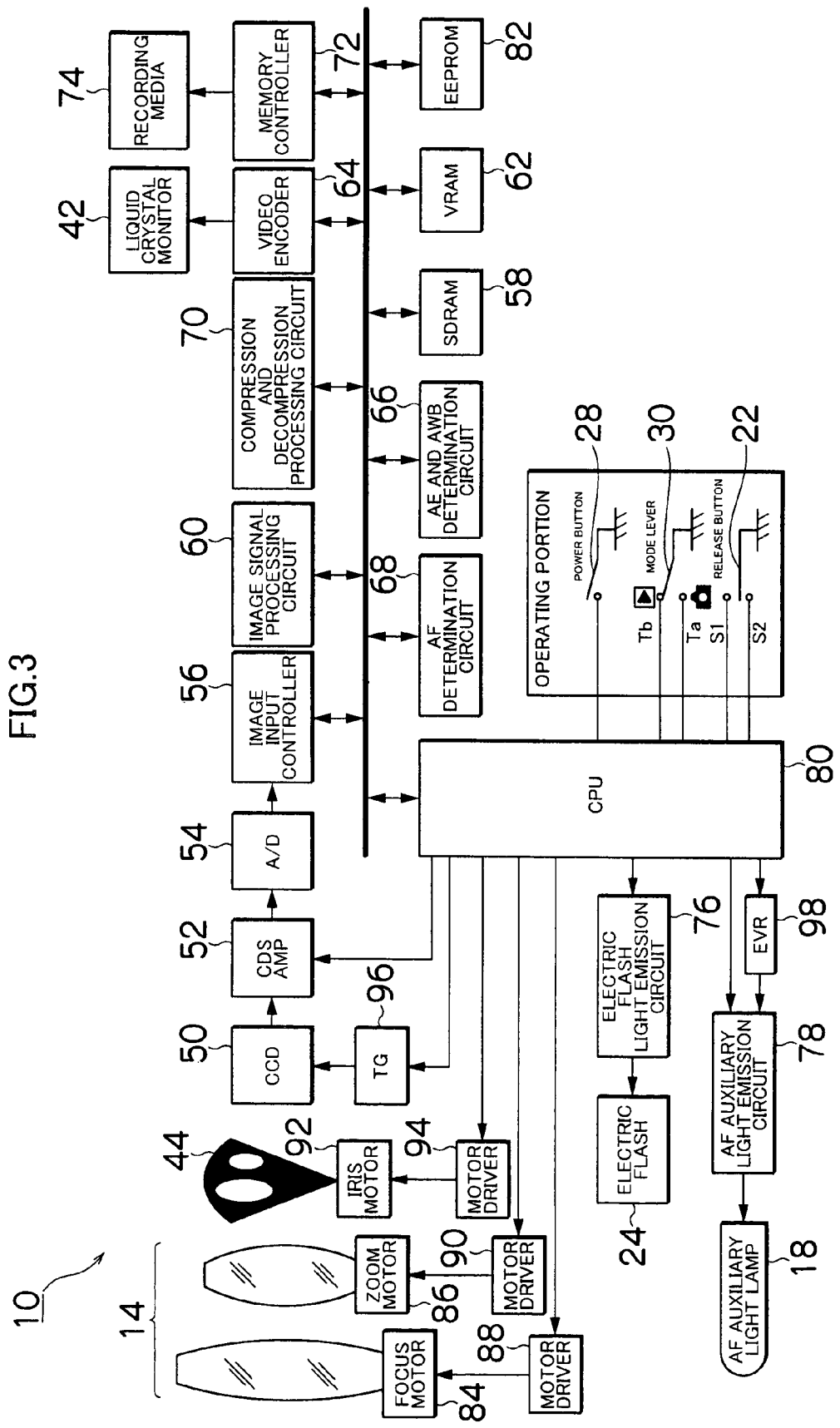
FIG. 3 is a block diagram showing the internal structure of the digital camera.

FIG. 3 is a block diagram showing the internal structure of the digital camera 10. As shown in FIG. 3, the digital camera 10 contains an image pickup element 50, an analog signal processing circuit 52, an A/D converter 54, an image input controller 56, a memory (SDRAM) 58, an image signal processing circuit 60, a VRAM 62, a video encoder 64, an AF determination circuit 68, an AE and AWB determination circuit 66, a compression and decompression processing circuit 70, a memory controller 72, a recording media 74, an electric flash light emission circuit 76, an AF auxiliary light emission circuit 78, a central processing unit (CPU) 80, an EEPROM 82, and the like. The digital camera 10 is generally controlled by the CPU 80. The EEPROM 82 stores camera control programs and various setting data required for the control.

When the release button 22, provided on the camera body 12, is "half-pressed", an S1-on signal is generated. When the release button 22 is "fully pressed", an S2-on signal is generated. The generated S1-on signal and S2-on signal are inputted to the CPU 80. According to the S1-on signal and the S2-on signal, the CPU 80 determines the depressed state of the release button 22.

Furthermore, when the mode lever 30 is set to the "image taking mode", a switch is connected to a terminal Ta. When the mode lever 30 is set to the "play mode", the switch is connected to a terminal Tb. A signal indicating the connection status of the switch is inputted to the CPU 80. According to the inputted signal, the CPU 80 determines the set mode of the camera.

Light emitted by the electric flash 24 is controlled by an electric flash light emission circuit 76 according to electric flash light emission command from the CPU 80.

The amount of light (lux) emitted by the AF auxiliary light lamp 18, which is composed of LED lamps, is regulated according to the value of a voltage applied to the AF auxiliary light lamp 18. The value of the voltage applied to the AF auxiliary light lamp 18 is regulated by an electronic variable resistance (EVR) 98. The CPU 80 sets an output voltage of the electronic variable resistance 98.

Figure 4:
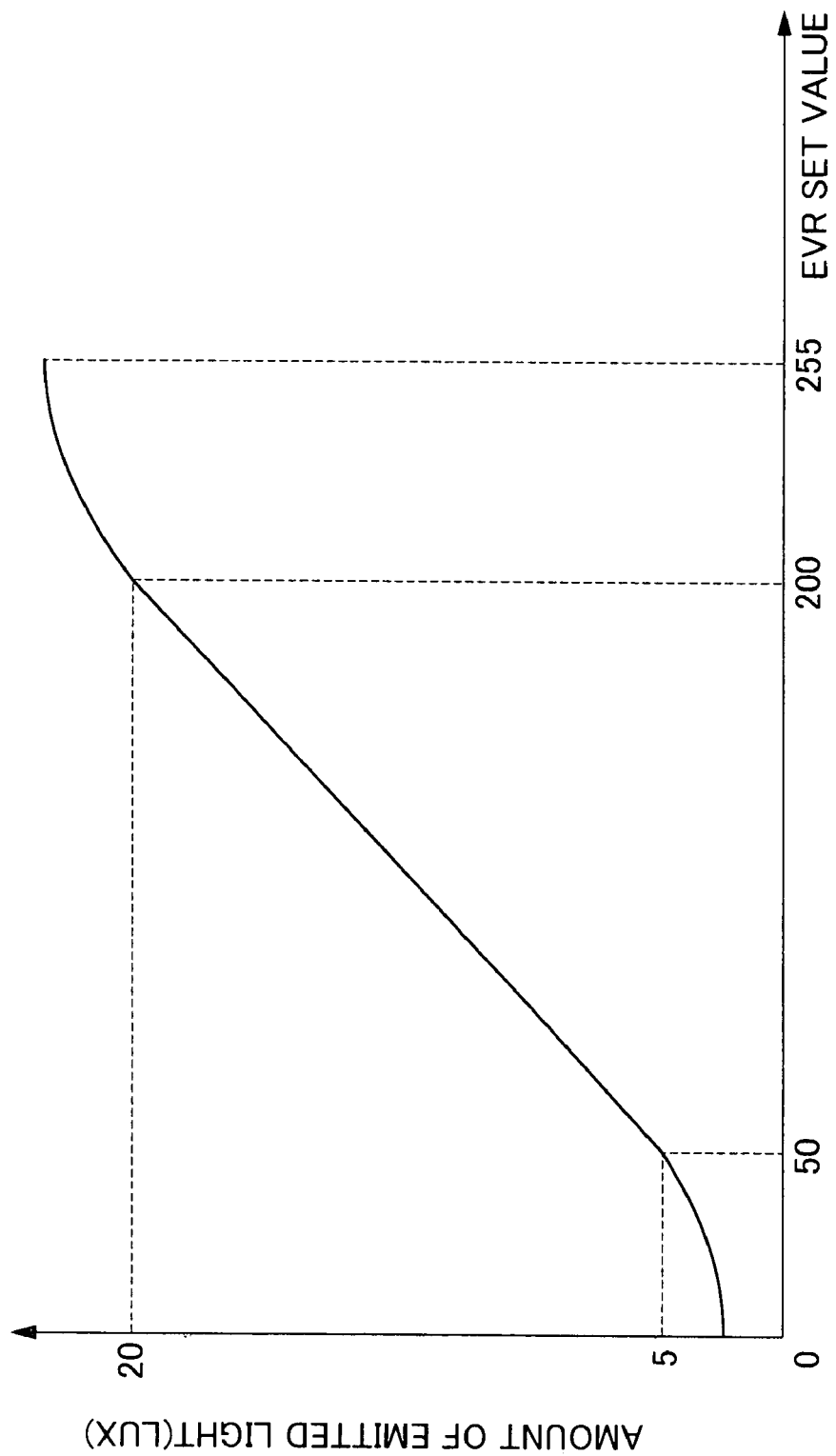
FIG. 4 is a graph showing the relationship between a set value in an electronic variable resistance and the amount of light emitted by an AF auxiliary light lamp.

A set value D for the output voltage of the electronic variable resistance 98 is outputted by the CPU 80 as an 8-bit digital signal (0 to 255). FIG. 4 shows an example of the relationship between the set value D and the amount of light (lux) emitted by the AF auxiliary light lamp 18. The CPU 80 uses a range from 50 to 200, which substantially exhibits linearity, as the set values D for the electronic variable resistance 98. In this case, the AF auxiliary lamp 18 emits light at 5 lux to 20 lux.

The image taking lens 14 is focused by using a focus motor to move a focus lens constituting the image taking lens 14. The image taking lens 14 is zoomed by using a zoom motor to move a zoom lens constituting the image taking lens 14. The focus motor 84 and the zoom motor 86 are drivingly controlled by a focus motor driver 88 and a zoom motor driver 90, respectively. The CPU 80 outputs control signals to the focus motor driver 88 and the zoom motor driver 90.

Furthermore, a diaphragm 44 is incorporated into the image taking lens 14. The diaphragm 44 is of what is called a turret type. An aperture value (F value) is varied by rotating a turret plate in which apertures with F2.8 and F8 are formed. The diaphragm 44 is driven by an iris motor 92. The iris motor 92 is drivingly controlled by an iris motor driver 94. The CPU 80 outputs control signals to the iris motor driver 94.

In the image taking mode, image light indicating an object is formed into an image on a light receiving surface of the CCD 50 via the image taking lens 14 and the diaphragm 44. The CCD 50 has a large number of photo sensors arranged on its light receiving surface. The optical image of the object formed on the light receiving surface is converted by each photo sensor into a signal charge of an amount corresponding to the amount of incident light. Signal charges accumulated in the photo sensors are sequentially read in accordance with timing pulses provided by a timing generator (TG) 96. The read signal charges are outputted to the analog signal processing circuit 52 as voltage signals corresponding to the signal charges.

In this connection, the CCD 50 comprises a charge sweep drain. By sweeping signal charges accumulated in the photo sensors to the charge sweep drain, the time for which signal charges are accumulated in the photo sensors (shutter speed) is controlled.

The analog signal processing circuit 52 includes correlation double sampling (CDS) processing circuit and an amplifier (AMP). The voltage signals are sequentially read from the CCD 50, and an R, G, and B signals are sampled and held and then amplified for each pixel. The amplified signals are applied to the A/D converter 54.

The A/D converter 54 converts sequentially inputted R, G, and B signals into digital R, G, and B signals. The digital R, G, and B signals outputted by the A/D converter 54 are temporarily stored in the memory 58 via the image input controller 56. Then, the memory 58 outputs the signals to the image signal processing circuit 60.

The image signal processing circuit 60 subjects the inputted image signals to predetermined signal processing such as an offset process, a gain control process including a white balance correction and a sensitivity correction, and a gamma correction process. The image signal processing circuit 60 then outputs the processed image data to the VRAM 62.

The VRAM 62 includes an area A and an area B each of which can store one frame of image data. The image data frames in the areas A and B are alternately rewritten. Then, the rewritten image data are alternately read.

The image data read from the VRAM 62 is encoded by the video encoder 64 and outputted to the liquid crystal monitor 42, provided on the rear surface of the camera body 12. According to an image displayed on the liquid crystal monitor 42 (through image), the user determines a composition and checks the focus state. The display of the liquid crystal monitor 42 is turned on and off using the display button 38 as described above.

In the above-described image taking mode, when the release button 22 is half-pressed, an AE and AF operations are started. Image data outputted by the A/D converter 54 is inputted to the AE and AWB determination circuit 66 and the AF determination circuit 68 via the image input controller 56.

The AE and AWB determination circuit 66 divides an image taking area into 64 pieces (eight in the horizontal direction and eight in the vertical direction) and integrates each color of image data R, G, or B in each piece of the image taking area. The AE and AWB determination circuit 66 then outputs at the CPU 80 the integrated data for each color of image data R, G, or B in each piece of the image taking area.

The AF determination circuit 68 calculates a contrast evaluation value for the contrast of the image in a preset particular focus area (for example, the center of the image taking area). The AF determination circuit 68 then outputs this contrast evaluation value to the CPU 80.

According to the contrast information inputted by the AF determination circuit 68, the CPU 80 outputs a control signal to the focus motor driver 88 to subject the image taking lens 14 to AF control to focus the lens 14 on the main object. The AF control will be described later.

Furthermore, the CPU 80 calculates the brightness (EV value) of the object according to the integrated data inputted by the AE and AWB determination circuit 66. Then, according to this EV value, the CPU 80 calculates the aperture value (F value) for the diaphragm 44 and the shutter speed (charge accumulation time) for the CCD 50.

When the AE and AF operations are completed and the release button 22 is fully pressed, the CPU 80 outputs a drive signal to the iris motor driver 94 according to the determined aperture value (F value) to control drivingly the diaphragm 44 so that its aperture diameter has the determined aperture value (F value). The CPU 80 further controls the charge accumulation time for the CCD 50 so as to achieve the determined shutter speed.

In this manner, the one frame of captured image data is inputted from the image input controller 56 to the memory 58 via the analog signal processing circuit 52 and the A/D converter 54. The image data is temporarily stored in the memory 58. The data is then read from the memory 58 and outputted to the image signal processing circuit 60. The image signal processing circuit 60 then executes predetermined signal processing including a process of generating luminance data and color difference data (YC process).

After the signal processing, the image data is stored in the memory 58 and then outputted to the compression and decompression processing circuit 70. The compression and decompression processing circuit 70 executes a predetermined compression process such as the JPEG (Joint Photographic Experts Group) process. Then, the image data is temporarily stored in the memory 58, then read by the memory controller 72, and subsequently recorded in the recording media 74 installed in a card slot.

The thus taken and recorded image data is reproduced and displayed on the liquid crystal monitor 42 by setting the digital camera 10 in the play mode. Specifically, by setting the mode lever 30 to the play mode, the image data recorded in the recording media 74 is read and outputted to the memory 58. The memory 58 then outputs the image data to the compression and decompression processing circuit 70. The compression and decompression processing circuit 70 decompresses the image data, and the processed image data is temporarily stored in the memory 58. Then, the image data is outputted to the liquid crystal monitor 42 via the video encoder 64. Thus, the image data recorded in the recording media 74 is reproduced and displayed on the liquid crystal monitor 42.

As described above, the digital camera 10 according to the present embodiment comprises the AF auxiliary light lamp 18 in the camera body 12. The AF auxiliary light lamp 18 assists the AF operation performed by the camera, by emitting light when the object has a low contrast as in the case with nighttime. Light emission is controlled as described below.

Figure 5:
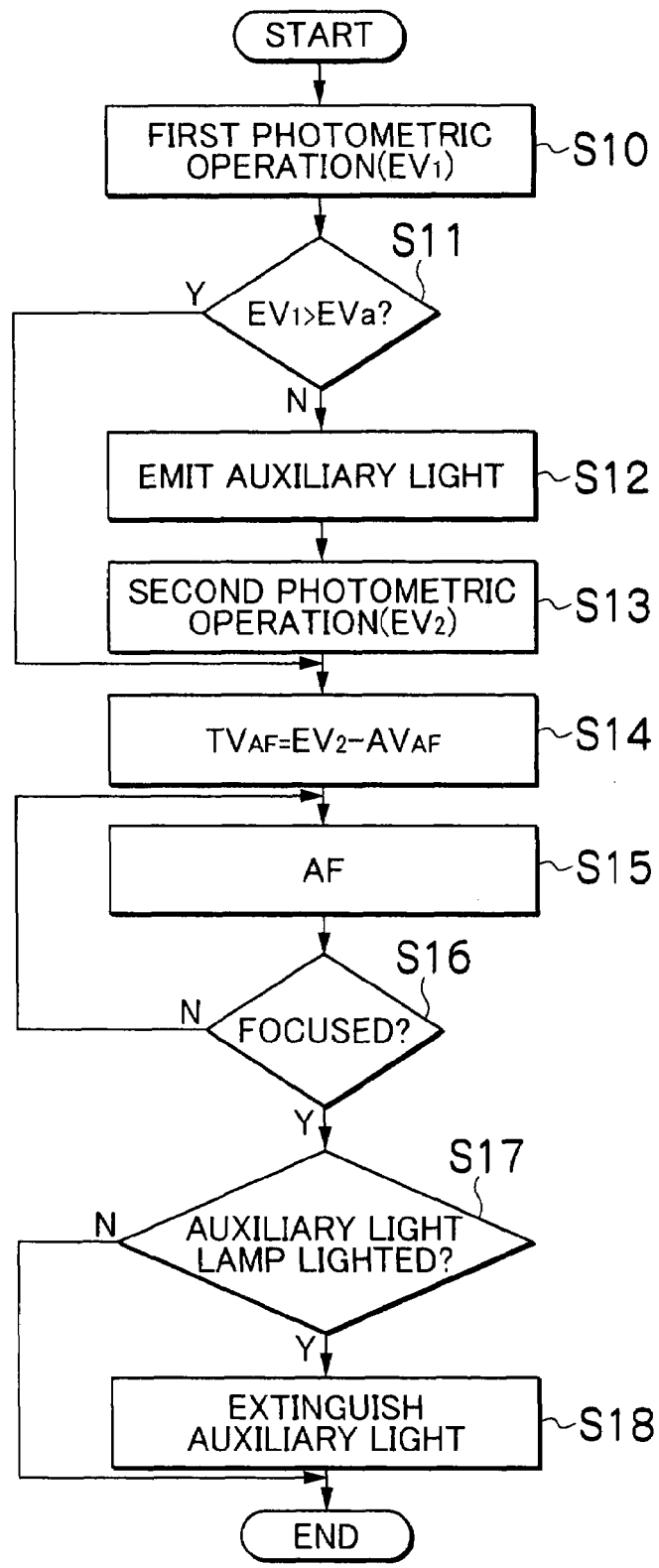
FIG. 5 is a flow chart of AF control executed by the digital camera.

FIG. 5 is a flow chart of AF control executed by the digital camera 10 according to the present embodiment.

As described above, in the image taking mode, when the release button 22 is half-pressed, the AE and AF operations are started.

First, a first photometric operation is performed (step S1). Specifically, with a preset aperture value and a preset shutter speed, the AE and AWB determination circuit 66 determines integrated data for each of R, G, and B in each piece of the image taking area according to image data obtained from the CCD 50. Then, according to the integrated data determined by the AE and AWB determination circuit 66, the CPU 80 calculates an EV value ($EV_1$) for the object.

Then, according to the calculated EV value ($EV_1$) for the object, it is determined whether auxiliary light needs to be emitted (step S11). Here, the CPU 80 compares the calculated EV value ($EV_1$) with a threshold $EV_a$. If the calculated EV value ($EV_1$) exceeds the threshold $EV_a$ ($EV_1 > EV_a$), it is determined that the auxiliary light does not need to be emitted. On the other hand, if the calculated EV value ($EV_1$) is equal to or smaller than the threshold $EV_a$ ($EV_1 \leq EV_a$), it is determined that the auxiliary light needs to be emitted.

If the auxiliary light needs to be emitted, a control signal is outputted to the AF auxiliary light emission circuit 78 to cause the AF auxiliary light lamp 18 to emit light (step S12). At this time, the electronic variable resistance 98 applies a preset predetermined voltage to the AF auxiliary light lamp 18 to illuminate the object with a predetermined amount of emitted auxiliary light.

Then, while the object is being illuminated with the auxiliary light, a second photometric operation is performed (step S13). Specifically, with the object remaining illuminated with the auxiliary light, integrated data is determined according to image data obtained from the CCD 50. Then, according to the determined integrated data, the CPU 80 calculates an EV value ($EV_2$) for the object.

Then, according to the determined EV value ($EV_2$), a shutter speed for the AF control ($TV_{AF}$) is determined (step S14). In this case, the AF control is carried out with the diaphragm 44 open (in the present example, F2.8). The shutter speed ($TV_{AF}$) is determined from the following equation (1) according to the aperture value ($AV_{AF}$) and the EV value ($EV_2$):

$$TV_{AF} = EV_2 - AV_{AF}. \quad (1)$$

On the other hand, if the auxiliary light does not need to be emitted, the shutter speed for the AF control is determined according to the results of the first photometric operation. That is, the shutter speed for the AF control is determined from the above equation according to the EV value ($EV_1$) determined according to the results of the first photometric operation.

Then, with the determined shutter speed, the AF control is carried out (step S15). After the focusing (step S16), it is determined whether or not the AF auxiliary light lamp 18 is lighted (step S17). If the AF auxiliary light lamp 18 is lighted, a control signal is outputted to the AF auxiliary light emission circuit 78 to extinguish the AF auxiliary light lamp 18 (step S18).

The AF operation is thus completed. Subsequently, when the release button 22 is fully pressed, an image is captured with the aperture value (F value) for the diaphragm 44 and the shutter speed both of which have been determined according to the results ($EV_1$) of the first photometric operation. The captured image data is subjected to predetermined image processing and thus compressed. The compressed image data is recorded in the recording media 74.

Thus, with the digital camera 10 according to the present embodiment, if the auxiliary light needs to be emitted for the AF control, the shutter speed (and the aperture value) for the AF control is set according to the EV value ($EV_2$) determined while emitting the auxiliary light. This enables the focus state to be determined with the appropriate exposure setting. Accurate focusing is thus possible.

In the present embodiment, the exposure for the AF control is set by varying the shutter speed with the diaphragm open. However, the exposure for the AF control may be set by varying the aperture value (F value) with the shutter speed fixed. In this case, the diaphragm 44 preferably has its aperture value varied in small increments (for example, F2.0→F2.8→F3.5→F4.0 . . . ) as in the case with an iris diaphragm.

Figure 6:
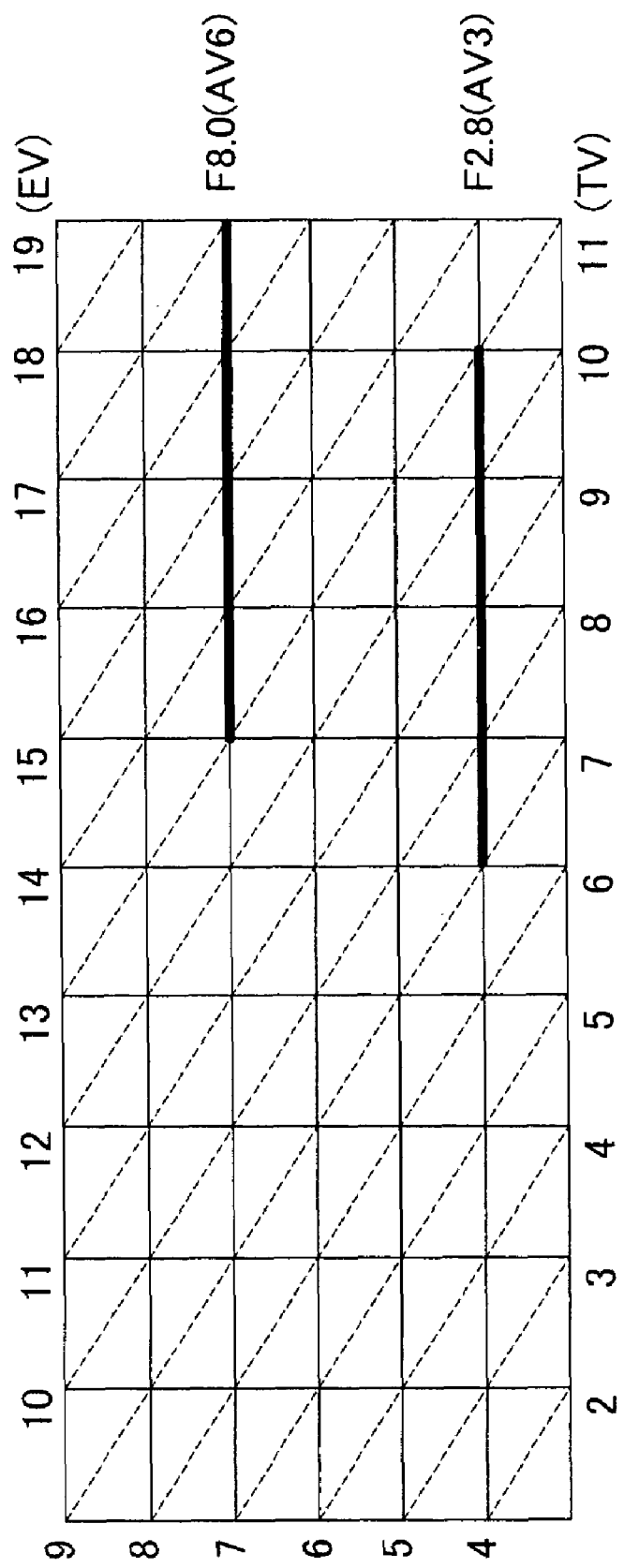
FIG. 6 is an AE program diagram for the AF control.

Alternatively, the exposure for the AF control may be set by varying both the shutter speed and the aperture value according to a preset AE program diagram. FIG. 6 shows an example of the AE program diagram. For example, when an object having undergone a photometric operation has an EV value of 12, the TV value (shutter value) and the AV value (aperture value) are set at 9 and 3, respectively. On the other hand, when an object having undergone a photometric operation has an EV value of 16, the TV value (shutter value) and the AV value (aperture value) are set at 8 and 6, respectively. Then, the AF control is executed with the set shutter speed and aperture value.

Figure 7:
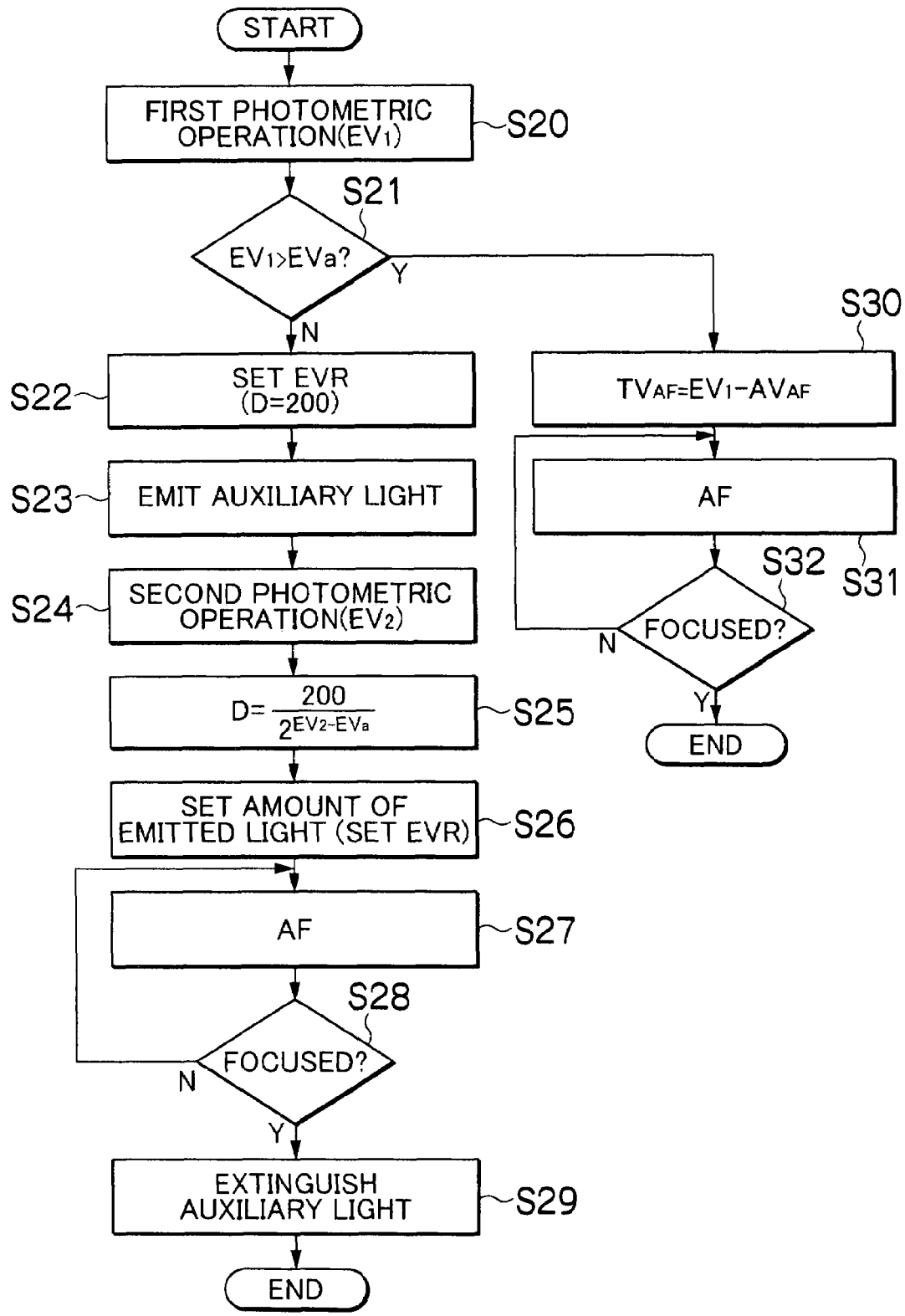
FIG. 7 is a flow chart of the AF control executed by the digital camera.

FIG. 7 is a flow chart of another embodiment of the AF control. In the above-described embodiment, the shutter speed and aperture value for the AF control are set according to the EV value determined by emitting the auxiliary light. Consequently, even if the auxiliary light is emitted, the AF control can be executed with the appropriate exposure setting. In the present embodiment, if the auxiliary light is emitted for an AF operation, the exposure for the AF control is regulated by adjusting the amount of emitted auxiliary light according to an EV value determined by emitting the auxiliary value. This control method will be described below in detail.

In the image taking mode, when the release button 22 is half-pressed, a first photometric operation is performed (step S20). Specifically, with a preset aperture value and a preset shutter speed, the AE and AWB determination circuit 66 determines integrated data for each of R, G, and B in each piece of the image taking area according to image data obtained from the CCD 50. Then, according to the integrated data determined by the AE and AWB determination circuit 66, the CPU 80 calculates an EV value ($EV_1$) for the object.

Then, according to the calculated EV value ($EV_1$) for the object, it is determined whether or not auxiliary light needs to be emitted (step S21). Here, the CPU 80 compares the calculated EV value ($EV_1$) with a threshold $EV_a$. If the calculated EV value ($EV_1$) exceeds the threshold $EV_a$ ($EV_1 > EV_a$), it is determined that the auxiliary light does not need to be emitted. On the other hand, if the calculated EV value ($EV_1$) is equal to or smaller than the threshold $EV_a$ ($EV_1 \leq EV_a$), it is determined that the auxiliary light needs to be emitted.

If the auxiliary light needs to be emitted, a voltage applied by the electronic variable resistance 98 is set to cause the AF auxiliary light lamp 18 to emit a predetermined amount of light (step S22). Then, a light emission instruction is outputted to the AF auxiliary light emission circuit 78 to apply the set voltage to the AF auxiliary light lamp 18. Thus, the AF auxiliary light lamp 18 emits the predetermined amount of light (step S23). In the present example, the electronic variable resistance 98 has a set value D of 200. Then, the AF auxiliary light lamp 18 emits light at 20 lux as shown in FIG. 4.

Then, while the object is being illuminated with the auxiliary light, a second photometric operation is performed (step S24). Specifically, with the object remaining illuminated with the auxiliary light, integrated data is determined according to image data obtained from the CCD 50. Then, according to the determined integrated data, the CPU 80 calculates an EV value ($EV_2$) for the object.

Then, according to the determined EV value ($EV_2$), the amount of emitted light optimum for the AF control is determined (step S25). In this case, the amount of light emitted by the AF auxiliary light lamp 18 varies depending on the set value D in the electronic variable resistance 98. The set value D in the electronic variable resistance 98 is determined from the following equation (2) according to the EV value ($EV_2$):

$$D = \frac{200}{2^{EV_2 - EV_a}}. \qquad (2)$$

As described above, the set value D in the electronic variable resistance 98 ranges from 50 to 200. Accordingly, if the set value calculated from the equation (2) is equal to or smaller than 50, the set value D becomes 50. If the set value calculated from the equation (2) is equal to or larger than 200, the set value D becomes 200.

Then, the set value D determined from the equation (2) is newly set in the electronic variable resistance 98 (step S26). With the new set value D (applied voltage), the AF auxiliary light lamp 18 emits light. Then, with the object remaining illuminated with the auxiliary light, the AF control is carried out (step S27). At this time, the AF auxiliary light lamp 18 emits the optimum amount of light for the AF control, so that the focus state can be easily determined. Consequently, the user can focus on the main object easily and accurately.

After the focusing based on the AF control (step S28), a control signal is outputted to the AF auxiliary light emission circuit 78 to extinguish the AF auxiliary light lamp 18 (step S29). The AF control is thus completed.

On the other hand, if it is determined in step S21 that the auxiliary light does not need to be emitted, the exposure for the AF control is determined on the basis the results of the first photometric operation (step S30). That is, the shutter speed for the AF control with the diaphragm open is determined according to the EV value ($EV_1$) determined from the results of the first photometric operation (TV=$EV_1$−AV). The exposure for the AF control may be set by varying the aperture value (F value) with the shutter speed fixed or by varying both the shutter speed and the aperture value according to a preset AE program diagram.

Then, the AF control is carried out with the determined exposure (shutter speed and aperture value) (step S31). After the focusing (step S32), the AF control is completed.

Subsequently, when the release button 22 is fully pressed, an image is captured with the aperture value (F value) for the diaphragm 44 and the shutter speed both of which have been determined according to the results ($EV_1$) of the first photometric operation. The captured image data is subjected to predetermined image processing and thus compressed. The compressed image data is recorded in the recording media 74.

Thus, with the digital camera according to the present embodiment, if the AF auxiliary light needs to be emitted for the AF control, the amount of emitted auxiliary light is set according to the EV value ($EV_2$) determined by emitting the auxiliary light. This enables the focus state to be determined with an appropriate exposure setting. Accurate focusing is thus possible.

Although the digital camera is described above as an example of the image capturing apparatus according to the present invention, the present invention is not limited to this. The present invention is applicable to any image capturing apparatus including any apparatus having image capturing function such as a mobile telephone, a personal digital assistant, etc.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image apparatus, comprising:
   an image pickup device;
   an image taking lens which forms an image of an object on the image pickup device, the image taking lens being subjected to autofocus control so as to focus on a main object according to contrast information on the image obtained from the image pickup device;
   an autofocus auxiliary light emitting device which emits a variable amount of autofocus auxiliary light to illuminate the object when a photometric value of the object is smaller than a predetermined value; and
   a setting device which operates when the autofocus auxiliary light is emitted, to set an aperture value and a shutter speed for the autofocus control according to a photometric value determined with illuminating the object with the autofocus auxiliary light.

2. The image capturing apparatus as defined in claim 1, wherein
   the setting device sets one of the aperture value and the shutter speed at a fixed value and sets the other according to the photometric value of the object.

3. The image capturing apparatus as defined in claim 1, wherein
   if the autofocus auxiliary light is not emitted, the setting device sets the aperture value and the shutter speed for the autofocus control according to a photometric value determined without illuminating the object with the autofocus auxiliary light.

4. The image capturing apparatus as defined in claim 3, wherein
   the setting device sets one of the aperture value and the shutter speed at a fixed value and sets the other according to the photometric value of the object.

5. An image capturing apparatus, comprising:
   an image pickup device;
   an image taking lens which forms an image of an object on the image pickup device, the image taking lens being subjected to autofocus control so as to focus on a main object according to contrast information on the image obtained from the image pickup device;
   an autofocus auxiliary light emitting device which emits autofocus auxiliary light to illuminate the object when a photometric value of the object is smaller than a predetermined value; and
   a setting device which operates when the autofocus auxiliary light is emitted, to set an amount of emitted autofocus auxiliary light according to a photometric value determined with illuminating the object with the autofocus auxiliary light.

6. The image capturing apparatus as defined in claim 5, further comprising:
   a second setting device which operates when the autofocus auxiliary light is not emitted, to set an aperture value and a shutter speed for the autofocus control according to a photometric value determined without illuminating the object with the autofocus auxiliary light.

7. A method of setting exposure for autofocus control executed by an image capturing apparatus having an image taking lens subjected to autofocus control so as to focus on a main object according to contrast information on an image obtained from an image pickup device, the object being illuminated with autofocus auxiliary light if a photometric value of the object is smaller than a predetermined value, the method comprising:
   determining the photometric value of the object to determine whether or not the autofocus auxiliary light needs to be emitted;
   if the autofocus auxiliary light needs to be emitted, illuminating the object with a variable amount of the autofocus auxiliary light and acquiring a photometric value; and
   setting an aperture value and a shutter speed for the autofocus control according to the photometric value acquired.

8. The method as defined in claim 7, wherein if the autofocus auxiliary light does not need to be emitted, the aperture value and the shutter speed for the autofocus control are set according to the photometric value determined when determining whether or not the autofocus auxiliary light needs to be emitted.

9. A method of setting exposure for autofocus control executed by an image capturing apparatus having an image taking lens subjected to autofocus control so as to focus on a main object according to contrast information on an image obtained from an image pickup device, the object being illuminated with autofocus auxiliary light if a photometric value of the object is smaller than a predetermined value, the method comprising:
   determining the photometric value of the object to determine whether or not the autofocus auxiliary light needs to be emitted;
   if the autofocus auxiliary light needs to he emitted, illuminating the object with the autofocus auxiliary light and acquiring a photometric value; and
   setting an amount of emitted autofocus auxiliary light for the autofocus control according to the photometric value acquired.

10. The method as defined in claim 9, wherein
    if the autofocus auxiliary light does not need to he emitted, the aperture value and the shutter speed for the autofocus control are set according to photometric value determined when determining whether or not the autofocus auxiliary light needs to be emitted.

* * * * *